US012686159B2

(12) United States Patent
Park

(10) Patent No.: US 12,686,159 B2
(45) Date of Patent: Jul. 21, 2026

(54) SYNTHETIC RESIN PIPE MANUFACTURING APPARATUS

(71) Applicant: Soon Sae Park, Cheonan-si (KR)

(72) Inventor: Soon Sae Park, Cheonan-si (KR)

( * ) Notice: Subject to any disclaimer, the term of this patent is extended or adjusted under 35 U.S.C. 154(b) by 303 days.

(21) Appl. No.: 18/287,498

(22) PCT Filed: Dec. 13, 2021

(86) PCT No.: PCT/KR2021/018848
§ 371 (c)(1),
(2) Date: Oct. 19, 2023

(87) PCT Pub. No.: WO2022/225129
PCT Pub. Date: Oct. 27, 2022

(65) Prior Publication Data
US 2024/0208131 A1     Jun. 27, 2024

(30) Foreign Application Priority Data

Apr. 21, 2021     (KR) ........................ 10-2021-0051527

(51) Int. Cl.
*B29C 48/89*          (2019.01)
*B29C 48/09*          (2019.01)
(Continued)

(52) U.S. Cl.
CPC .............. *B29C 48/89* (2019.02); *B29C 48/09* (2019.02); *B29C 48/92* (2019.02); *B29L 2023/22* (2013.01)

(58) Field of Classification Search
CPC . F25B 6/04; F25B 39/04; B29D 23/00; B29L 2023/22
See application file for complete search history.

(56) References Cited

U.S. PATENT DOCUMENTS 3,488,809 A * 1/1970 James ..................... B29C 48/89
                                                              264/564
4,643,657 A * 2/1987 Achelpohl ............ B29C 48/912
                                                              425/72.1
(Continued)

FOREIGN PATENT DOCUMENTS

JP          3590213 B2 * 11/2004    ......... B29C 66/1122
JP          4576030 B2 * 11/2010    .......... B29C 66/131
(Continued)

OTHER PUBLICATIONS

International Search Report for PCT/KR2021/018848 mailed Apr. 11, 2022 from Korean Intellectual Property Office.

*Primary Examiner* — Alison L Hindenlang
*Assistant Examiner* — Debjani Roy
(74) *Attorney, Agent, or Firm* — Revolution IP, PLLC

(57) ABSTRACT

The present disclosure relates to a synthetic resin pipe manufacturing apparatus including: an extruder configured to extrude a synthetic resin pipe through a blow molding portion; an air fitting formed in a cylindrical shape having the same inner diameter as the synthetic resin pipe and formed in front of an air supply pipe, which is formed inside the extruder; an air discharge plate disposed in front of the air ejection pipe and having a plurality of air discharge holes perforated in a disc to discharge hot air, generated as air ejected through the air holes cools the inner surface of the synthetic resin pipe, to the outside; the air supply pipe disposed behind the air fitting and having a plurality of air holes perforated therein; and a rotation driver configured to transmit rotation power to the air supply pipe.

3 Claims, 13 Drawing Sheets

(51) Int. Cl.
B29C 48/92 (2019.01)
B29L 23/00 (2006.01)

(56)                                References Cited

U.S. PATENT DOCUMENTS

| | | | | |
|---|---|---|---|---|
| 2002/0023448 A1 * | 2/2002 | Ito | ....................... | F28D 1/05375 |
| | | | | 62/210 |
| 2021/0283817 A1 | 9/2021 | Gneuss et al. | | |
| 2022/0183181 A1 * | 6/2022 | Montes Monteserin | ................... | |
| | | | | H05K 7/20236 |

FOREIGN PATENT DOCUMENTS

| | | | | | |
|---|---|---|---|---|---|
| KR | 20-0286003 Y1 | | 8/2002 | | |
| KR | 10-0496550 B1 | | 7/2005 | | |
| KR | 20060020371 | * | 3/2006 | | |
| KR | 20-0432460 Y1 | | 12/2006 | | |
| KR | 10-1011877 B1 | | 2/2011 | | |
| KR | 101435861 B1 | * | 11/2014 | ............. | B29D 23/18 |
| KR | 10-2019-0119694 A | | 10/2019 | | |
| WO | 2020-099684 A1 | | 5/2020 | | |

* cited by examiner

[A]

[B]

[A]

[B]

[90 : 91, 92, 93, 94]

[202 : 202a, 202b, 202c, 202d, 202e]

[400A : 400A1, 400A2, 400A3]

[400A : 400A1, 400A2, 400A3]

SYNTHETIC RESIN PIPE MANUFACTURING APPARATUS

TECHNICAL FIELD

The present disclosure relates to a synthetic resin pipe manufacturing apparatus, and more particularly, to a synthetic resin pipe manufacturing apparatus that can, by rotating an air fitting configured to spray cooling air toward an inner surface of a synthetic resin pipe while supporting the inner surface of the synthetic resin pipe, enable uniform cooling treatment by the cooling air and thus manufacture a high-quality synthetic resin pipe.

BACKGROUND ART

Generally, as piping materials that are buried in the ground, synthetic resin pipes are mainly used in consideration of factors such as economic feasibility and workability.

For the synthetic resin pipes, quadrangular profiles having a hollow therein are extruded and cooled, and then, while the extruded and cooled quadrangular profiles are spirally supplied to a winder apparatus, a molten resin is supplied between the profiles so that the profiles are continuously integrally connected to mold smooth synthetic resin pipes.

However, the conventional double-wall synthetic resin pipes are vulnerable to soil pressure or external pressure, and a phenomenon in which a binding force with the resin connecting the profiles is weakened according to an external temperature change, causing the profiles to be separated, frequently occurs, which are causes of degradation of product reliability.

Also, in order to prevent such shortcomings, integral extrusion molding of reinforcing bars of various shapes inside the quadrangular profiles has been proposed, which slightly improves strength, but since the amount of consumed raw materials is increased by 20 to 30% corresponding to the improvement in strength, effects are insignificant.

Accordingly, in recent years, a synthetic resin pipe having reinforcing walls standing upright to have hollows formed therein at predetermined intervals has been proposed. The conventional synthetic resin pipe is molded while being extruded, which is possible when using an easily-cooled raw material such as polyvinyl chloride (PVC). However, when a raw material that is not easily cooled, such as polyethylene (PE), is used, a molding speed is very slow and thus productivity is decreased, and a phenomenon in which hollows are not properly formed and the synthetic resin pipe sags toward an inner diameter thereof occurs in the production process.

RELATED ART DOCUMENTS

Patent Documents (Patent Document 1) Document 1. Korean Patent Registration No. 10-0496550 (Date of Registration: Jun. 13, 2005)

(Patent Document 2) Document 2. Korean Patent Registration No. 10-1011877 (Date of Registration: Jan. 24, 2011)

(Patent Document 3) Document 3. Korean Patent Registration No. 10-1435861 (Date of Registration: Aug. 25, 2014)

DISCLOSURE

Technical Problem

The present disclosure is directed to providing a synthetic resin pipe manufacturing apparatus that can prevent a sagging phenomenon by an air fitting supporting an inner surface of a synthetic resin pipe, simultaneously allow a thickness of the synthetic resin pipe to be constantly maintained and eject air through an air ejection port formed in front of the air fitting to cool and mold the synthetic resin pipe that is extruded and rotates, and rotate the air fitting to enable uniform cooling treatment through cooling air, thus allowing a high-quality synthetic resin pipe having excellent durability to be manufactured.

Further, the present disclosure is directed to providing a synthetic resin pipe manufacturing apparatus that forms a plurality of recesses along an air discharge plate of an air fitting to prevent air from stagnating in a blocked space between the air discharge plate and an inner surface of a synthetic resin pipe and allow the air to be immediately exhausted to the outside.

Further, the present disclosure is directed to providing a synthetic resin pipe manufacturing apparatus that has a coolant storage tank provided between two tanks that exchange a refrigerant of liquid nitrogen, cools a coolant to a predetermined temperature through a heat exchange between the refrigerant and the coolant which are exchanged through the inside of the storage tank and then allows the coolant to be supplied to and recovered from a cooler of a dice, and allows cooling air, generated during the heat exchange, to be supplied toward an air fitting.

Also, further, the present disclosure is directed to providing a synthetic resin pipe manufacturing apparatus that can improve quality through internal air cooling, low-temperature and customized cooling temperature control, and the like, thus not only improving a production speed, but also significantly reducing the length of the facility itself by addressing the conventional problem that, during manufacture of a synthetic resin pipe, a cooling zone for cooling is long and the length of the facility itself is inevitably long, thereby implementing a movable structure that can be moved by being mounted on various moving devices.

In addition, further, the present disclosure is directed to providing a synthetic resin pipe manufacturing apparatus that allows ultrasonic inspection to be immediately performed for a surface of a manufactured synthetic resin pipe, and particularly, allows a coolant for cooling treatment for the synthetic resin pipe to be utilized during the ultrasonic inspection.

Technical Solution

The present disclosure provides a synthetic resin pipe manufacturing apparatus including:

an extruder configured to, while slowly rotating a resin supplied from a raw material supply device, extrude a synthetic resin pipe through a blow molding portion so that a hollow portion is formed in a spiral shape in a longitudinal direction;

an air fitting formed in a cylindrical shape having the same inner diameter as the synthetic resin pipe and formed in front of an air supply pipe, which is formed inside the extruder, in order to support an inner surface of the synthetic resin pipe that is extruded from the extruder and introduced into a cooler of a dice;

an air ejection pipe disposed in front of the air fitting and having a plurality of air holes formed therein to cool the inner surface of the synthetic resin pipe;

an air discharge plate disposed in front of the air ejection pipe and having a plurality of air discharge holes perforated in a disc to discharge hot air, generated as air ejected through the air holes cools the inner surface of the synthetic resin pipe, to the outside;

the air supply pipe disposed behind the air fitting and having a plurality of air holes perforated therein so that air is discharged to cool the hollow portion of the synthetic resin pipe in which the hollow portion is formed as the synthetic resin pipe is extruded from the extruder; and a rotation driver configured to transmit rotation power to the air supply pipe, wherein, by the rotation driver, the air supply pipe and the air fitting, the air ejection pipe, and the air discharge plate which are integrally formed therewith rotate together, a plurality of recesses configured to discharge the hot air to the outside together with the air discharge holes are formed to be recessed at equal intervals along a circumference of an outer circumferential surface of the air discharge plate, and the synthetic resin pipe manufacturing apparatus further includes an ultrasonic inspection unit configured to perform a surface inspection of the synthetic resin pipe manufactured by passing through the air discharge plate.

Advantageous Effects

A synthetic resin pipe manufacturing apparatus according to the present disclosure has effects of allowing a high-quality synthetic resin pipe having excellent durability to be manufactured, enabling coolant circulation and temperature control, and allowing cooling air, generated during a heat exchange, to be used in cooling treatment for a synthetic resin pipe.

Also, the synthetic resin pipe manufacturing apparatus according to the present disclosure has an effect of allowing a coolant for cooling treatment for the synthetic resin pipe to be utilized during ultrasonic inspection.

4

Figure 7:
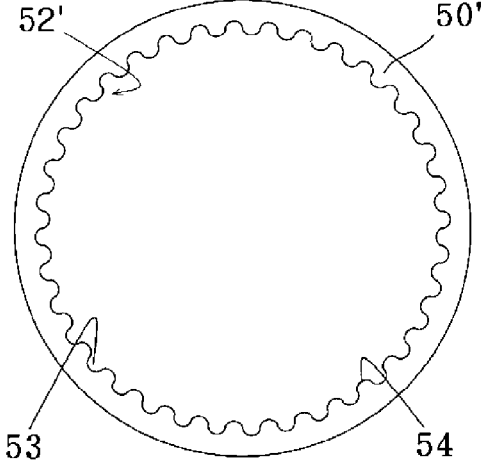

FIG. 7 is a lateral configuration diagram for showing formation of concave and convex surfaces of a synthetic resin pipe.

Figure 8:
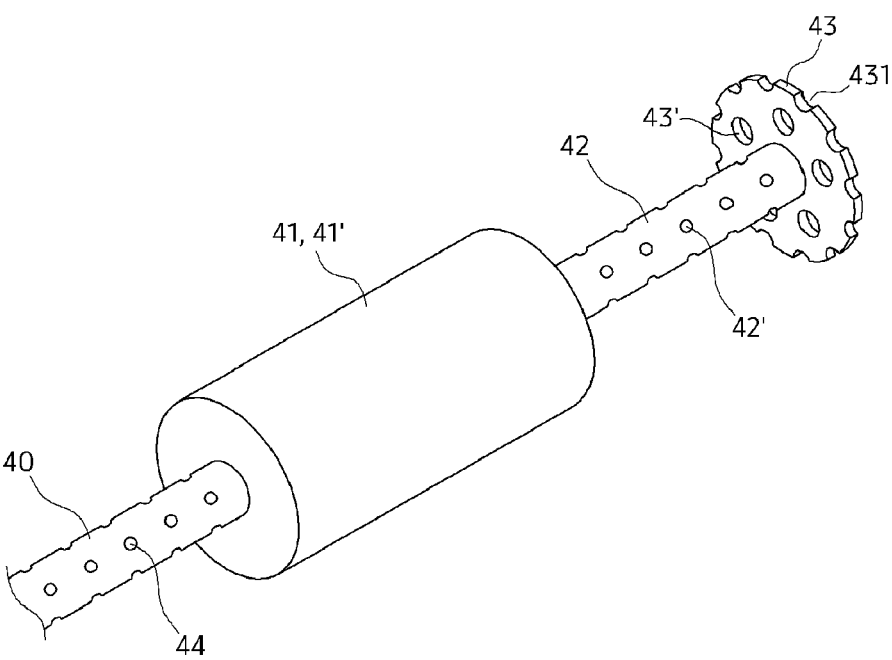

FIG. 8 is a three-dimensional configuration diagram for showing recesses in the manufacturing apparatus of the present disclosure.

Figure 9:
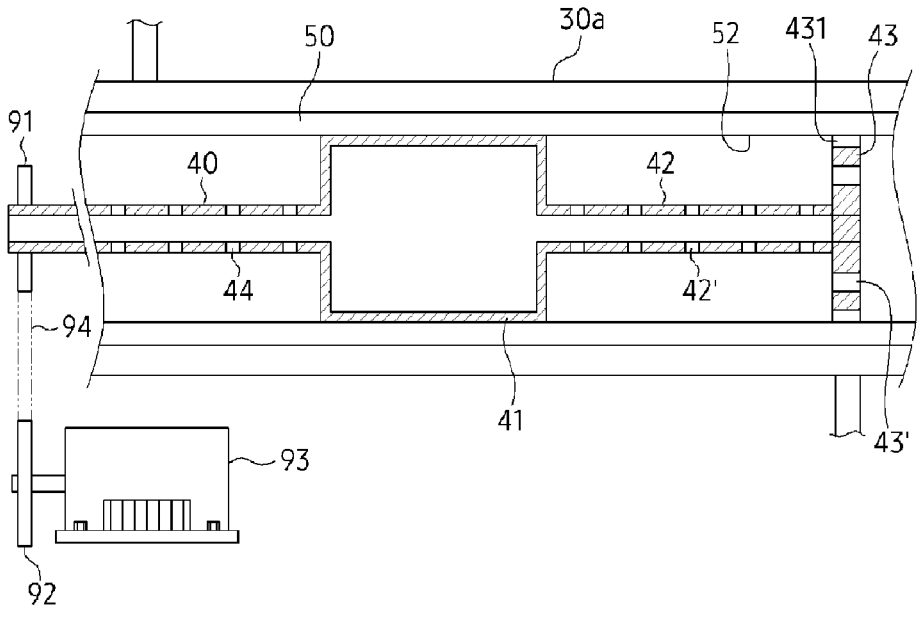

FIG. 9 is a partial cross-sectional configuration diagram for showing recesses and a rotation driver in the manufacturing apparatus of the present disclosure.

Figure 10:
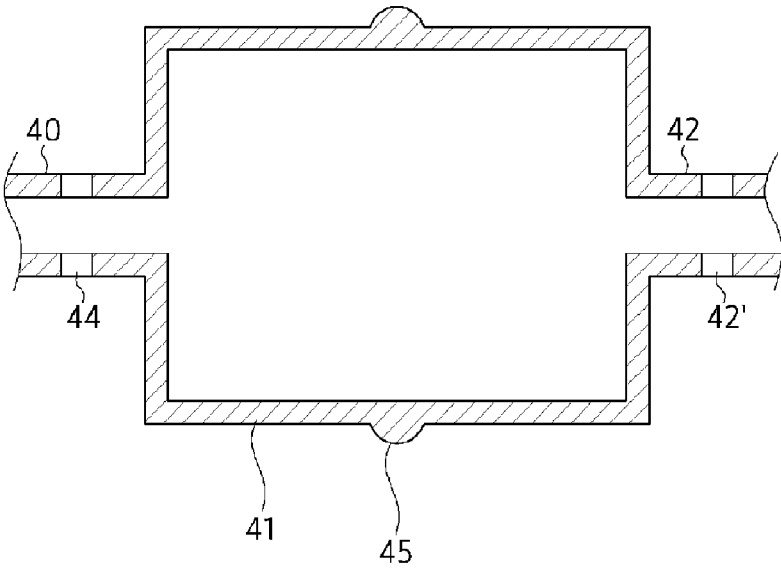

FIG. 10 is a partial cross-sectional configuration diagram for showing protrusions.

Figure 11:
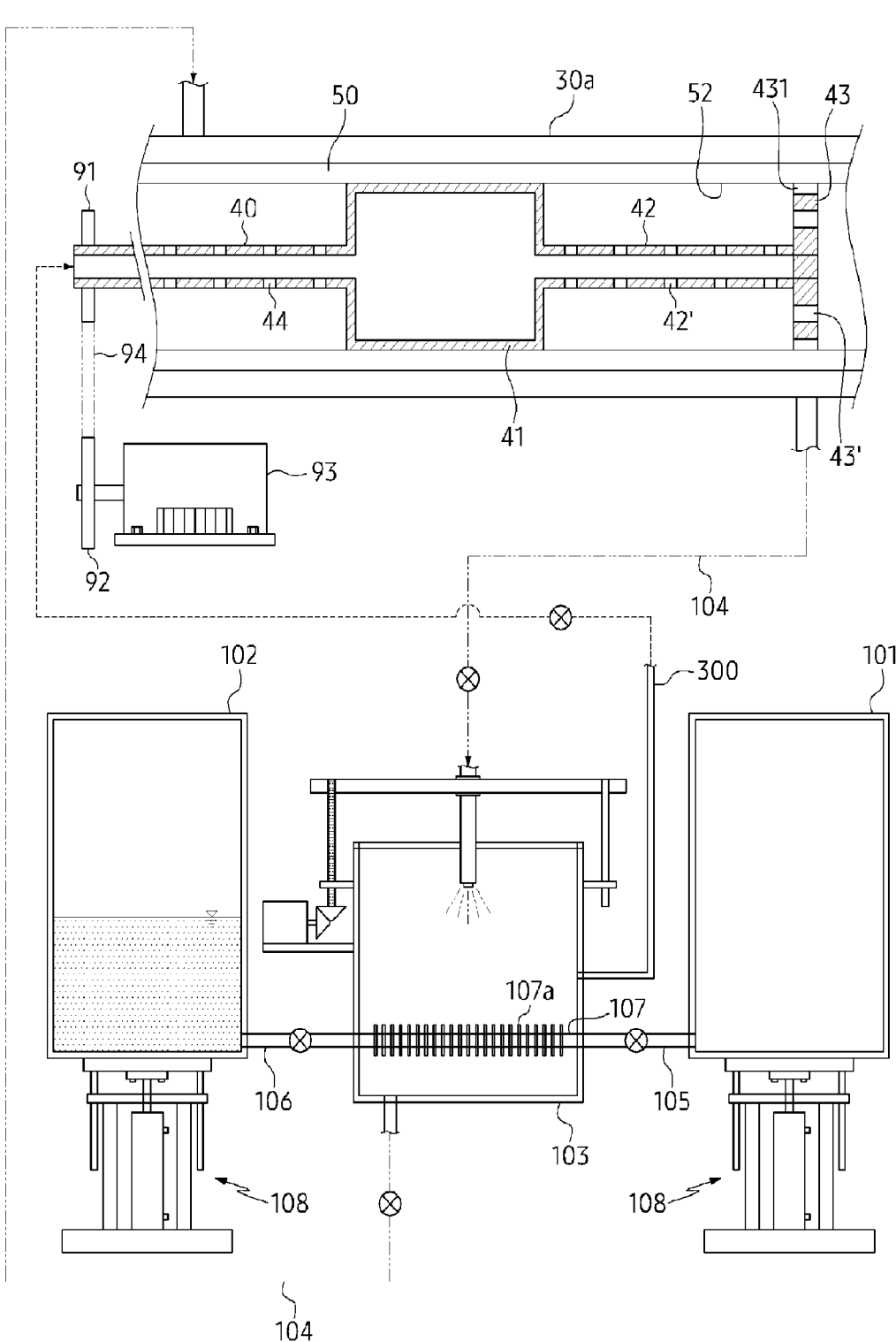

FIG. 11 is a configuration diagram for showing a rotation driver and a coolant circulation unit.

Figure 12:
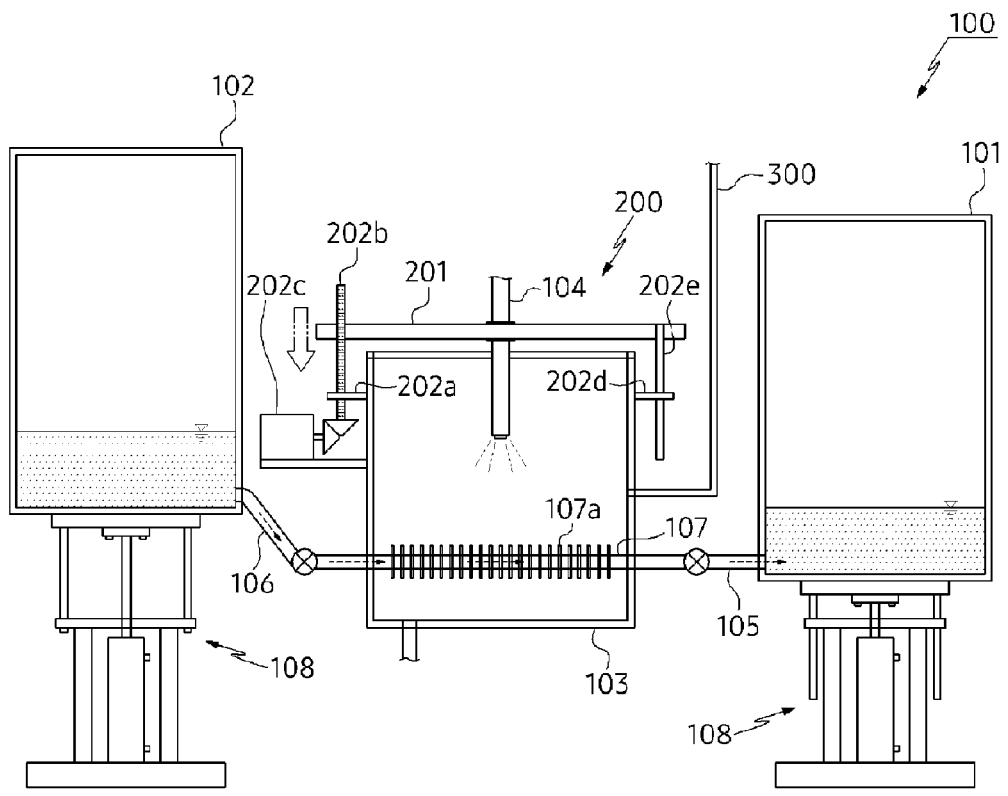

FIG. 12 is an operational state configuration diagram for showing a refrigerant movement process.

Figure 13:
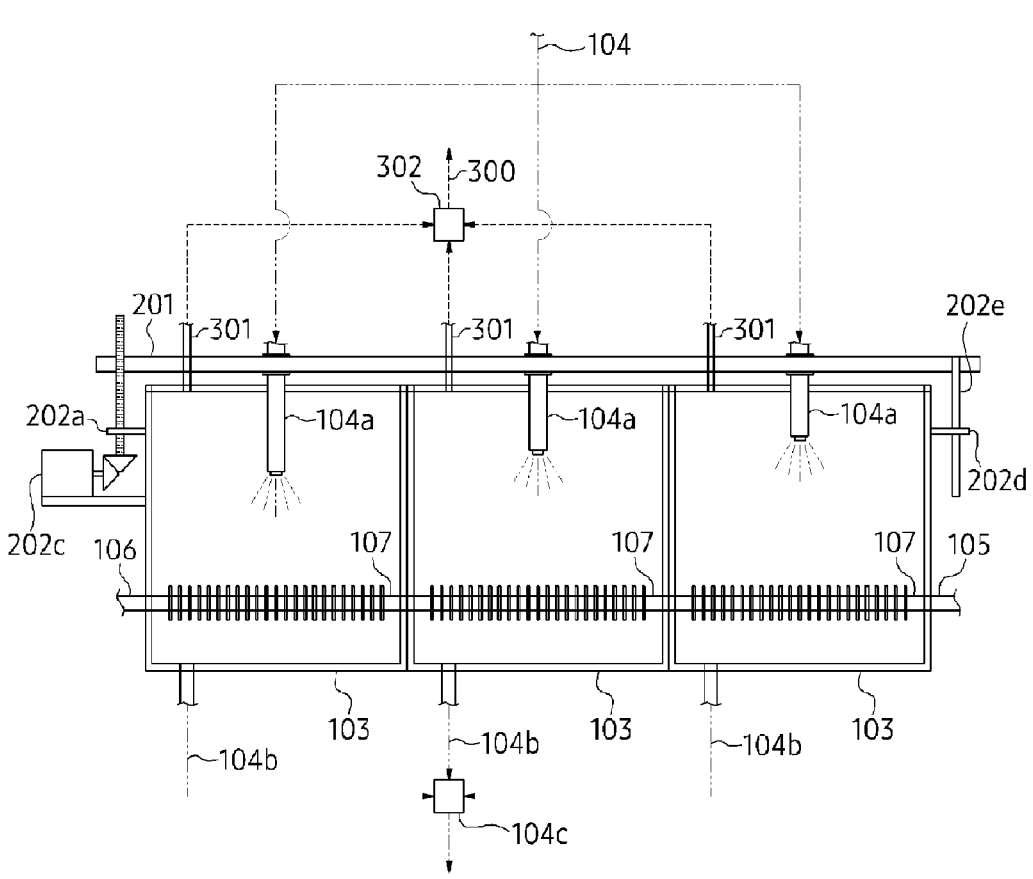

FIG. 13 is an operational state configuration diagram for showing a heat exchange process of another embodiment.

Figure 14:
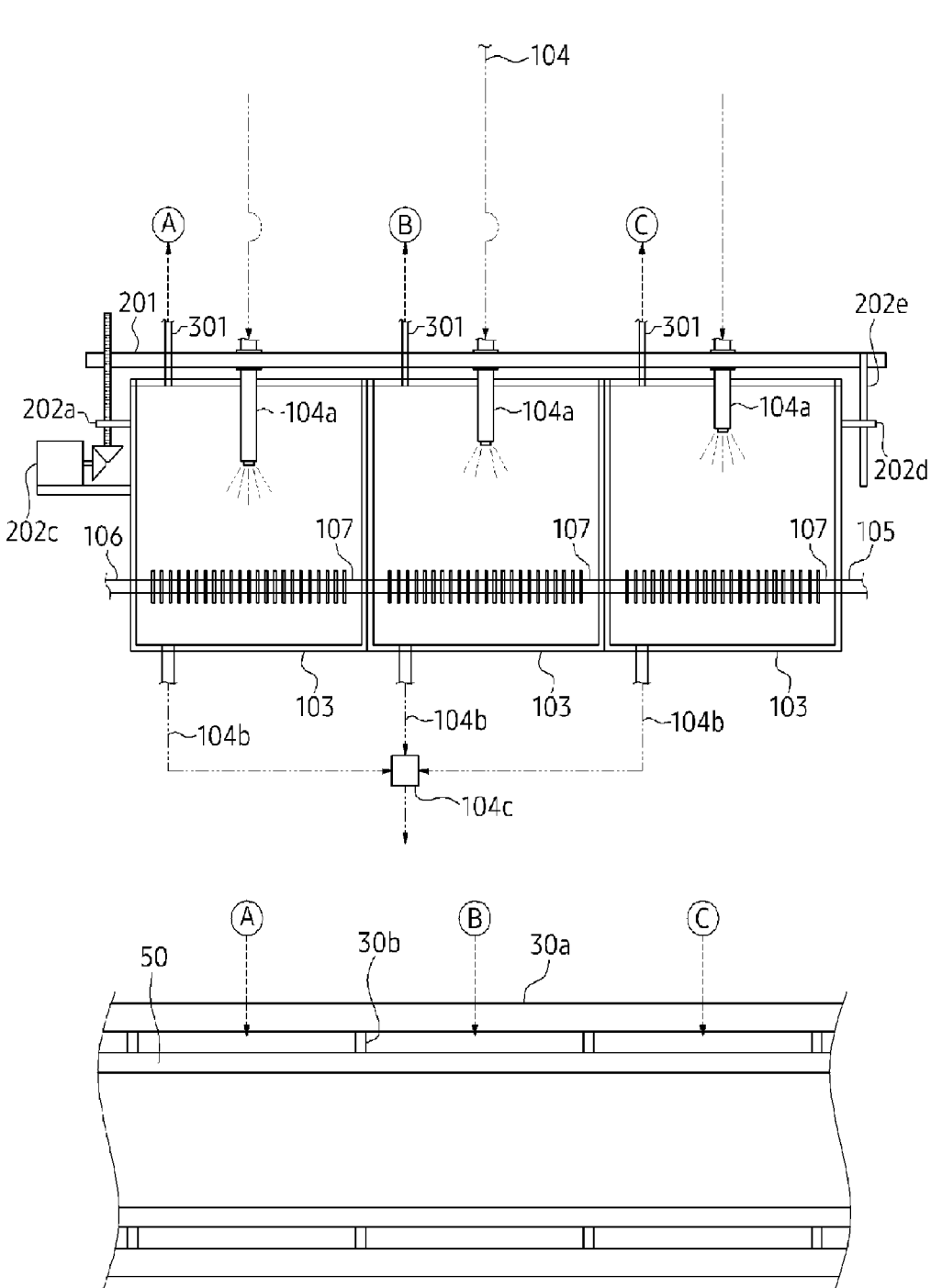

FIG. 14 is an operational state configuration diagram for showing a heat exchange process of still another embodiment.

Figure 15:
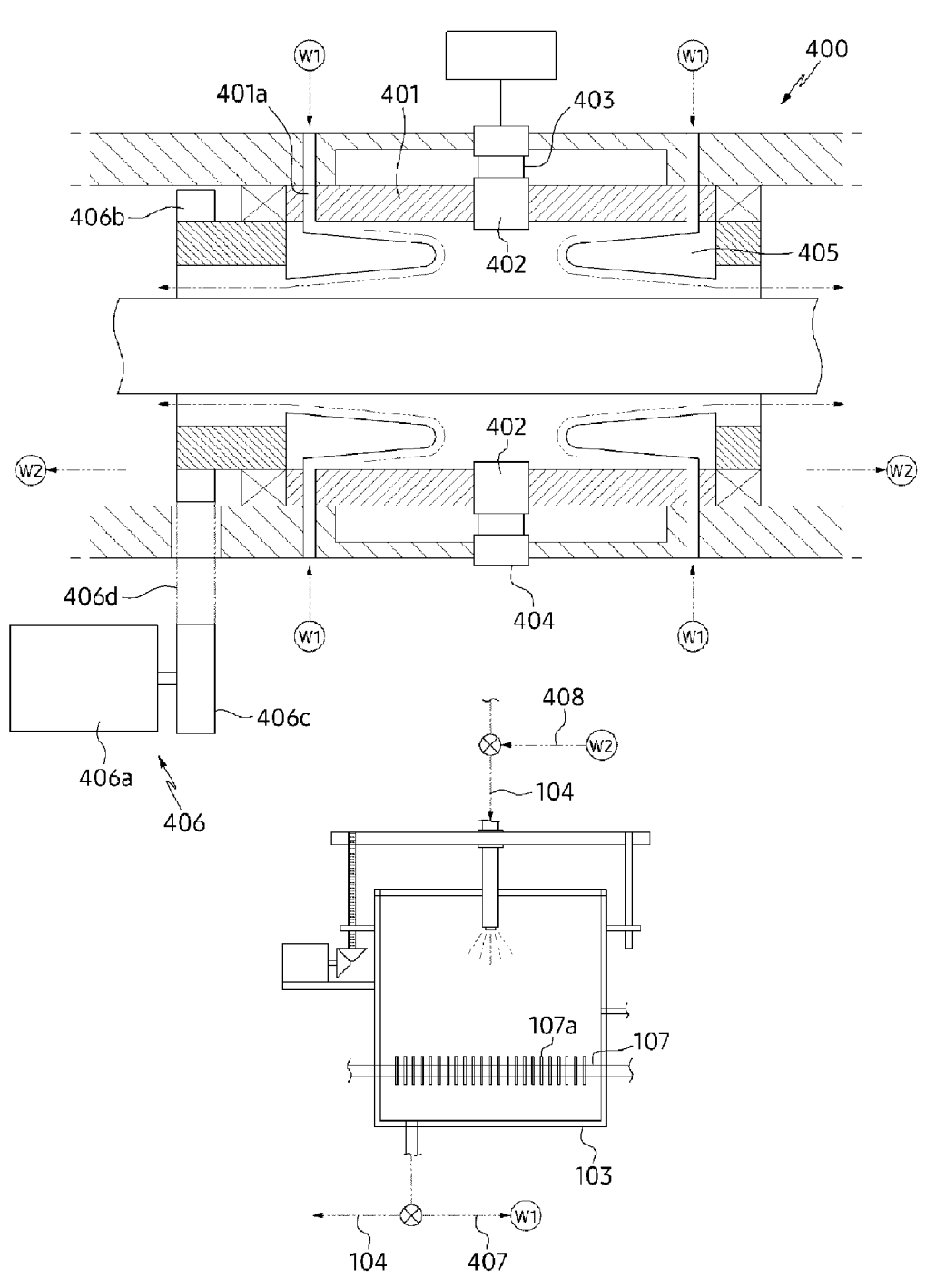

FIG. 15 is a cross-sectional configuration diagram for showing an ultrasonic inspection unit.

Figure 16:
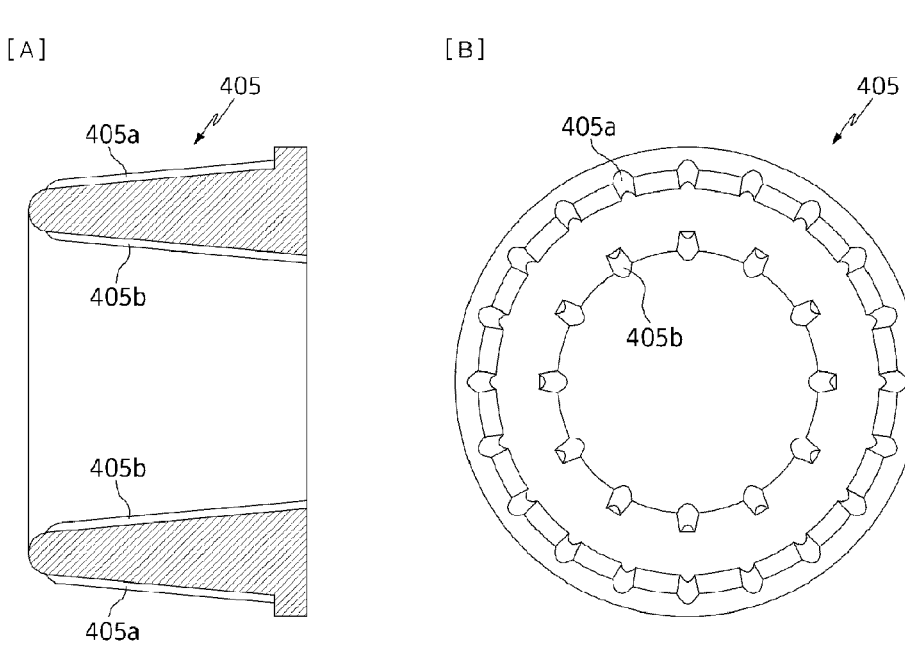

FIG. 16 shows cross-sectional and lateral configuration diagrams for showing outer and inner guides of a fluid guiding member.

Figure 17:
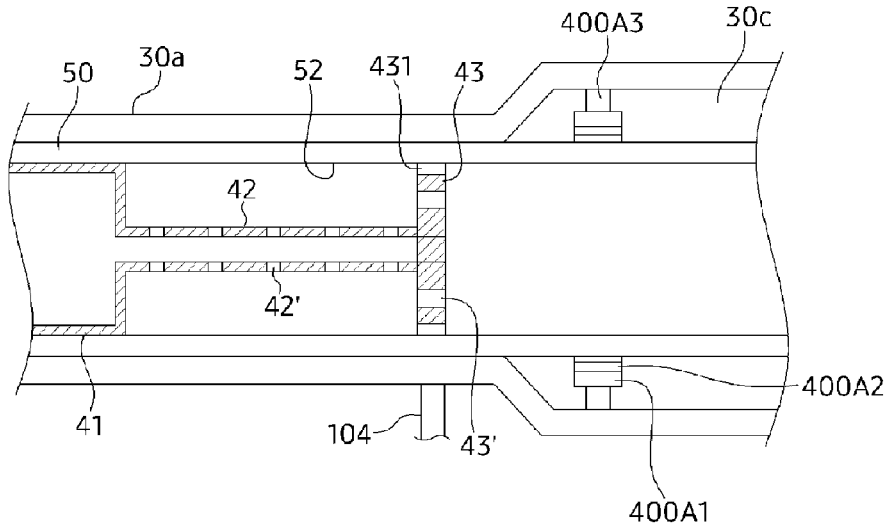
Figure 18:
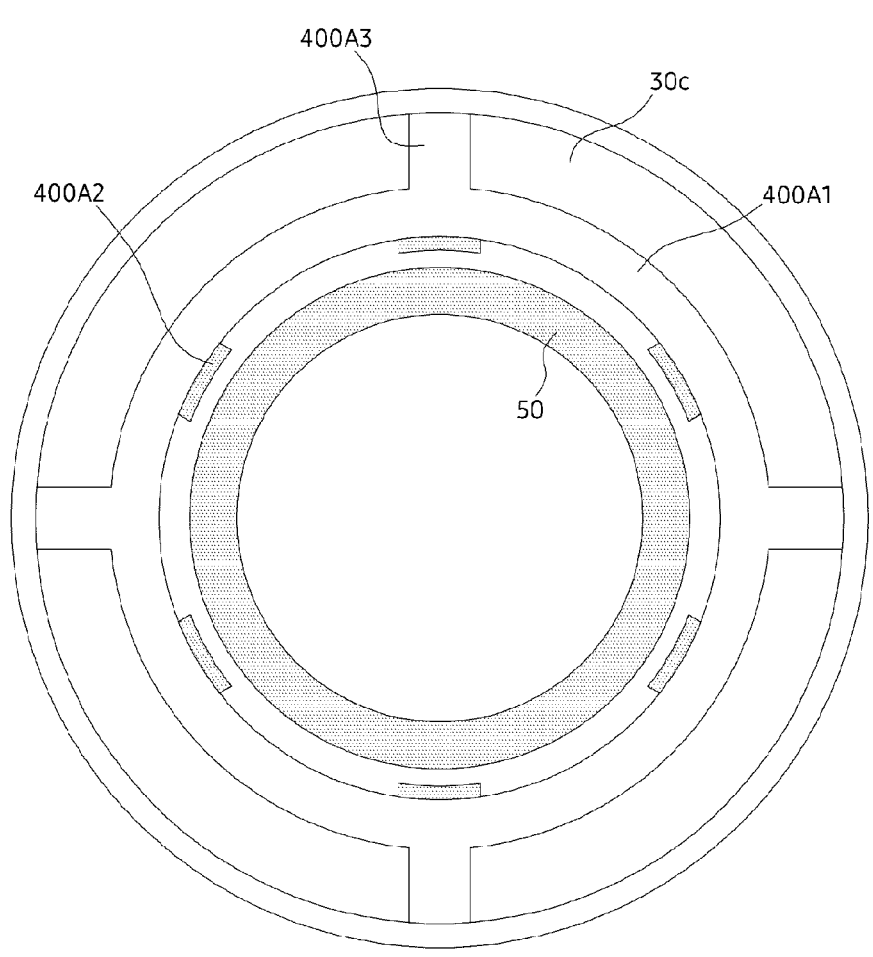

FIGS. 17 and 18 are configuration diagrams for showing an ultrasonic inspection unit of a second implementation example.

MODES OF INVENTION

Hereinafter, exemplary embodiments of the present disclosure will be described in detail with reference to the accompanying drawings.

Prior to the description, it should be noted that terms or words used in the specification and the claims should not be interpreted as being limited to their general or dictionary meanings and should be interpreted to have meanings and concepts consistent with the technical spirit of the present disclosure, based on the principle that the inventor may appropriately define the concepts of terms in order to describe his or her invention in the best possible way. Therefore, the embodiments described in the specification and the configurations illustrated in the drawings are only exemplary embodiments of the present disclosure and do not represent the entire technical spirit of the present disclosure, and thus it should be understood that various equivalents and modifications that can replace the embodiments may be present at the time of filing this application.

Figure 1:
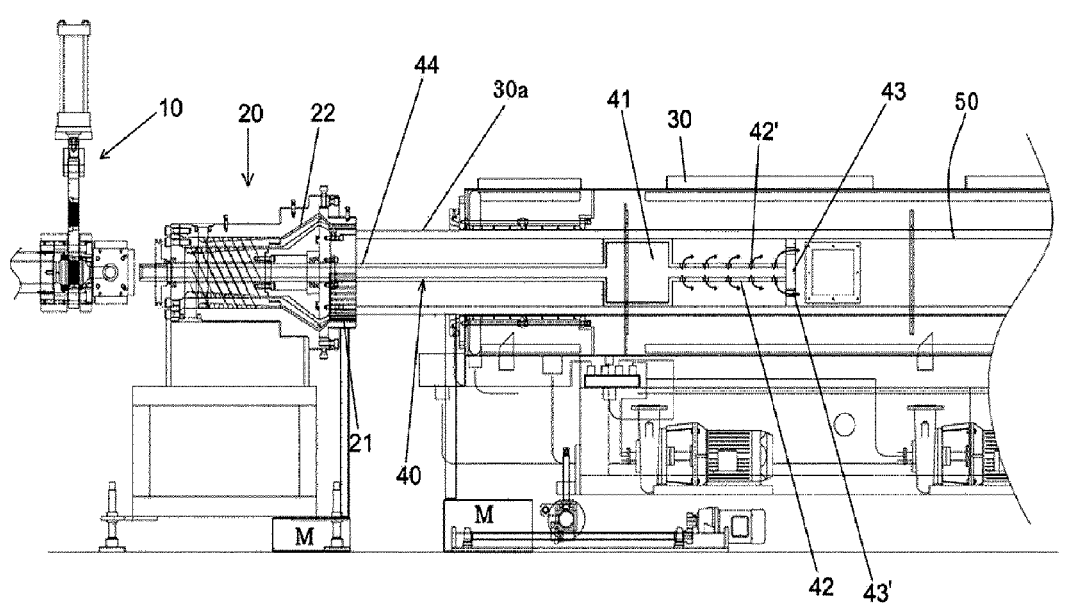
FIG. 1 is a configuration diagram illustrating a synthetic resin pipe manufacturing apparatus according to the present disclosure.
Figure 2:
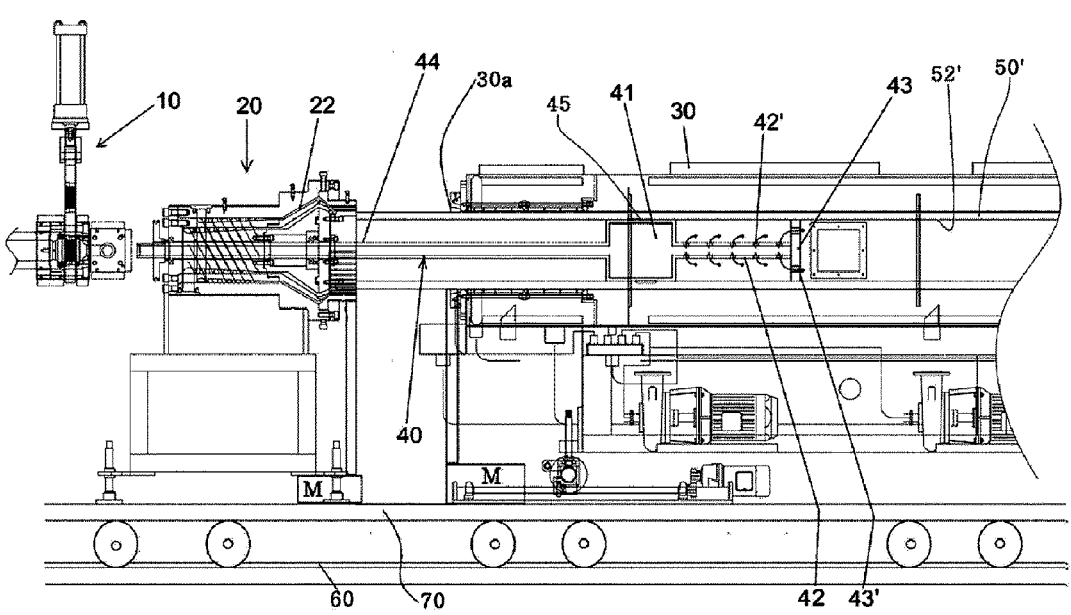
FIG. 2 is a configuration diagram illustrating a state in which the manufacturing apparatus of the present disclosure is mounted on a transfer device that is moved along a rail.

As illustrated in FIG. 1, a synthetic resin pipe manufacturing apparatus according to the present disclosure is configured so that a raw material supply device 10 for molding a synthetic resin pipe 50 is formed, and heat is applied to a raw material supplied to an extruder 20 through the raw material supply device 10 to mold and extrude the synthetic resin pipe 50 through the extruder 20 that is expanded forward.

Here, a blow molding portion 21 configured to form a hollow portion 51 in a spiral shape in a longitudinal direction inside the synthetic resin pipe 50 is configured in front of the extruder 20. Also, in order to cool the hollow portion 51 of the synthetic resin pipe 50 extruded to the front of the extruder 20, air holes 44 are perforated behind an air fitting 41 at a point where the extruder 20 ends.

Also, in order to cool an inner surface 52 of the synthetic resin pipe 50 extruded from the extruder 20 after the hollow portion 51 is formed therein, a plurality of air holes 42' are also perforated in front of the air fitting 41 that extends to an inner center of the extruder 20 and is inserted into an inner center of a dice 30.

Also, the synthetic resin pipe 50 extruded from the extruder 20 is configured to be guided to a cooler 30a of the dice 30, and an air supply pipe 40 is configured to extend from an inner central portion of the synthetic resin pipe 50 guided to the cooler 30a and is configured to be inserted into the extruder 20. Here, the extruder 20 and the dice 30 are configured to, due to being heated by a heater, receive power of a motor M and slowly rotate, and thus the spiral hollow portion 51 is formed in the longitudinal direction in the synthetic resin pipe 50 extruded from the extruder 20.

Further, the air fitting 41 is formed in a cylindrical shape having the same inner diameter as the synthetic resin pipe 50 in front of the air supply pipe 40 and is configured to come in close contact with the inner surface 52 of the synthetic resin pipe 50 and support the synthetic resin pipe to prevent sagging thereof.

Also, an air ejection pipe 42 is formed in front of the cylindrical air fitting 41 to eject air supplied through the air supply pipe 40 and is configured to have the plurality of air holes 42' perforated in an outer circumferential surface thereof.

Also, an air discharge plate 43 having a plurality of air discharge holes 43' perforated therein is configured as a disc in front of the air ejection pipe 42 to allow hot air, generated during cooling of the inner surface 52 of the synthetic resin pipe 50 by air ejected through the air holes 42', to be discharged to the outside.

The raw material supply device, the extruder, and the dice described in the present disclosure mold the synthetic resin pipe while being connected to each other in reality although separately illustrated or illustrated together throughout the drawings.

Meanwhile, in another embodiment of the present disclosure, as in FIG. 9, a synthetic resin pipe 50' extruded through the extruder 20 is guided to the cooler 30a of the dice 30 and is configured so that a plurality of circular protrusions 45 are formed on an outer circumferential surface of a cylindrical air fitting 41' that supports an inner surface 52' of the synthetic resin pipe 50' in a cylindrical shape.

Therefore, as the air fitting 41' rotates, concave portions 53 and convex portions 54 are formed on the inner surface 52' of the synthetic resin pipe 50' by the circular protrusions 45 formed on the outer circumferential surface of the air fitting 41' and induce a flow velocity to be high while reinforcing the strength of the synthetic resin pipe 50'.

An embodiment of the synthetic resin pipe manufacturing apparatus of the present disclosure that is configured as described above will be described in detail with reference to FIG. 1. When a raw material is supplied from the raw material supply device 10, the raw material is supplied through the extruder 20.

Here, by receiving power of the motor M and slowly rotating while being heated, the extruder 20 extrudes synthetic resin pipes 50 and 50a through an expansion pipe 22 of the extruder 20.

Figure 5:
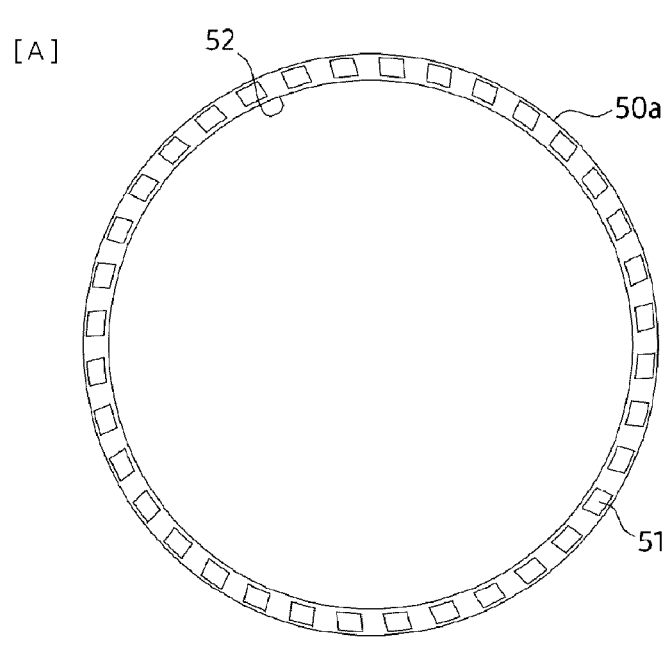
FIGS. 5A and 5B are lateral configuration diagrams for showing synthetic resin pipes of various implementation examples.
Figure 5:
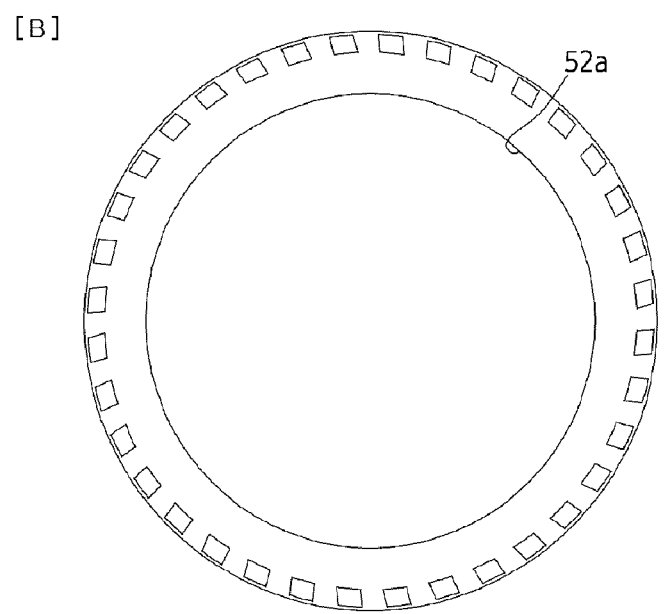

As in FIG. 5A, the synthetic resin pipe 50a is extruded while the spiral hollow portion 51 is formed in the longitudinal direction as the synthetic resin pipe 50a slowly rotates through the blow molding portion 21 formed in front of the expansion pipe 22 of the extruder 20. Also, air supplied to the air supply pipe 40 formed at an inner central portion of the extruder 20 cools the hollow portion 51 of the synthetic resin pipe 50a while being discharged through the air holes 44 of the air supply pipe 40 formed inside the extruder 20. The synthetic resin pipe 50a manufactured in this way may be installed and used as a drain pipe or the like which is a non-pressure pipe.

Here, as in FIG. 5B, the synthetic resin pipe 50a may be implemented to have a structure of a pressure pipe by being extruded so that an inner body 52a, which has a form surrounding the inner surface 52, is further formed, and the synthetic resin pipe 50a implemented in this way, which is a pressure pipe, may be installed and used as a water pipe, a gas supply pipe, an oil transportation pipe, or the like.

Figure 6:
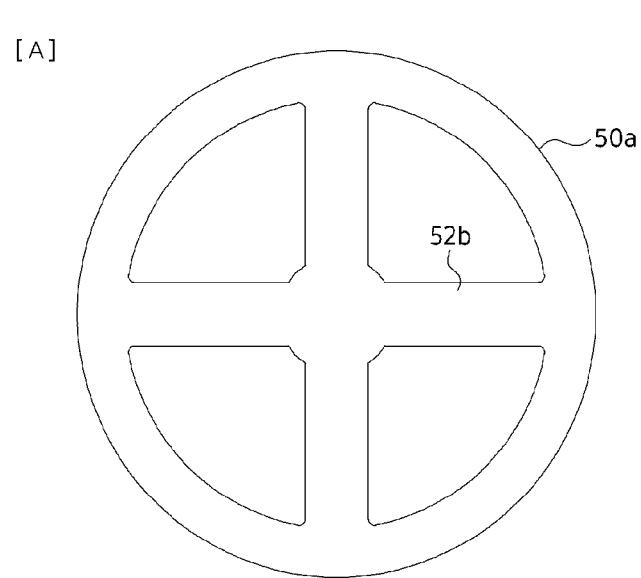
FIG. 6 is lateral configuration diagrams for showing synthetic resin pipes of various implementation examples.
Figure 6:
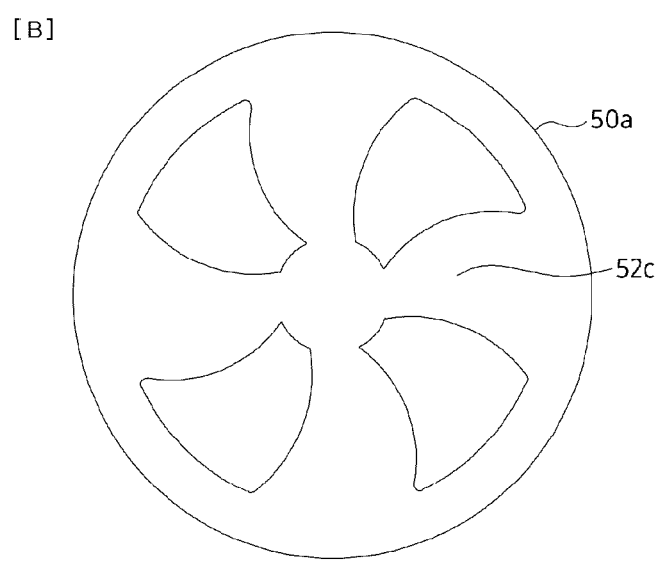

Also, the synthetic resin pipe may be implemented to have a structure of a pressure pipe by being extruded so that a cross-shaped first support body 52b is formed in a spiral shape inside the synthetic resin pipe in the longitudinal direction thereof as in FIG. 6A or by being extruded so that a second support body 52c having the shape of a typical fan blade is formed in a spiral shape inside the synthetic resin pipe in the longitudinal direction thereof as in FIG. 6B, and the synthetic resin pipe implemented in this way, which is a high-pressure pipe, may be used by being installed in deep water such as a river or the sea.

A configuration for extruding the synthetic resin pipe 50 from the extruder 20 so that the spiral hollow portion 51 is formed in the synthetic resin pipe 50 in the longitudinal direction thereof is a known configuration, and thus detailed description thereof will be omitted.

Also, while the synthetic resin pipe 50 extruded from the extruder 20 is guided to the inside of the cooler 30a of the dice 30, which receives power and slowly rotates together with the extruder 20 while being coupled to the front of the extruder 20, so that an external surface and an internal surface of the synthetic resin pipe 50 are molded to be aesthetically pleasing, the inner surface 52 of the synthetic resin pipe 50 is cooled so that the synthetic resin pipe 50, which is heated while being extruded, is molded with a uniform thickness without sagging.

That is, inside the synthetic resin pipe 50 guided into the cooler 30a of the dice 30, while the inner surface 52 of the synthetic resin pipe 50 is supported and prevented from sagging by the air fitting 41 formed in a cylindrical shape in front of the air supply pipe 40 inserted into the extruder 20, the inner surface 52 of the synthetic resin pipe 50 is cooled as air is discharged through the air holes 42' of the air ejection pipe 42 formed in front of the air fitting 41.

Here, in order to increase a cooling effect by air ejected through the air holes 42' of the air ejection pipe 42 being intensively ejected to the inner surface 52 of the synthetic resin pipe 50 without being dispersed to the outside, the air discharge plate 43 is formed in a circular shape in front of the air ejection pipe 42 to collect the ejected air to perform cooling.

Also, hot air generated as the inner surface 52 of the synthetic resin pipe 50 is cooled by air ejected through the air holes 42' of the air ejection pipe 42 is discharged to the outside through the plurality of air discharge holes 43' perforated in the air discharge plate 43 formed in front of the air ejection pipe 42.

Also, as in FIGS. 7 and 10, when the inside of the synthetic resin pipe 50' guided to the cooler 30a of the dice 30 is supported using the air fitting 41' according to another embodiment of the present disclosure, that is, the air fitting 41' having the circular protrusions 45 formed on the outer circumferential surface thereof, since the concave portions 53 and the convex portions 54 are also formed on the inner surface 52' of the synthetic resin pipe 50' by the circular protrusions 45 formed on the outer circumferential surface of the air fitting 41', the strength of the synthetic resin pipe 50' is reinforced, and the flow velocity is induced to be high. Here, the synthetic resin pipe 50' extruded through the extruder 20 is extruded while the blow molding portion 21 formed at an end of the extruder 20 is separated so that the hollow portion 51 is not formed.

Figure 3:
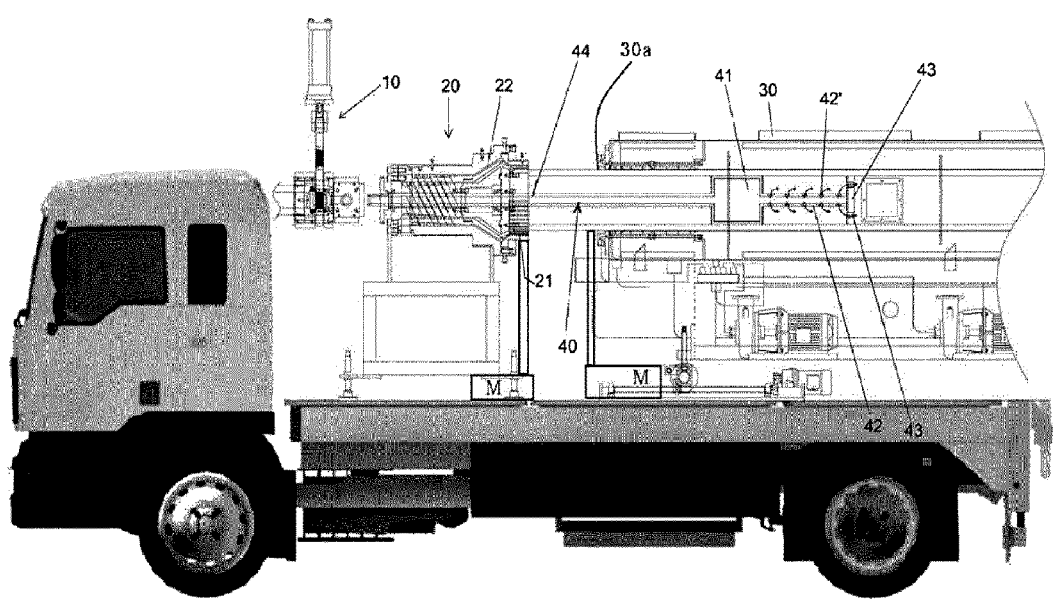
FIG. 3 is a configuration diagram illustrating a state in which the manufacturing apparatus of the present disclosure is mounted on a trailer.
Figure 4:
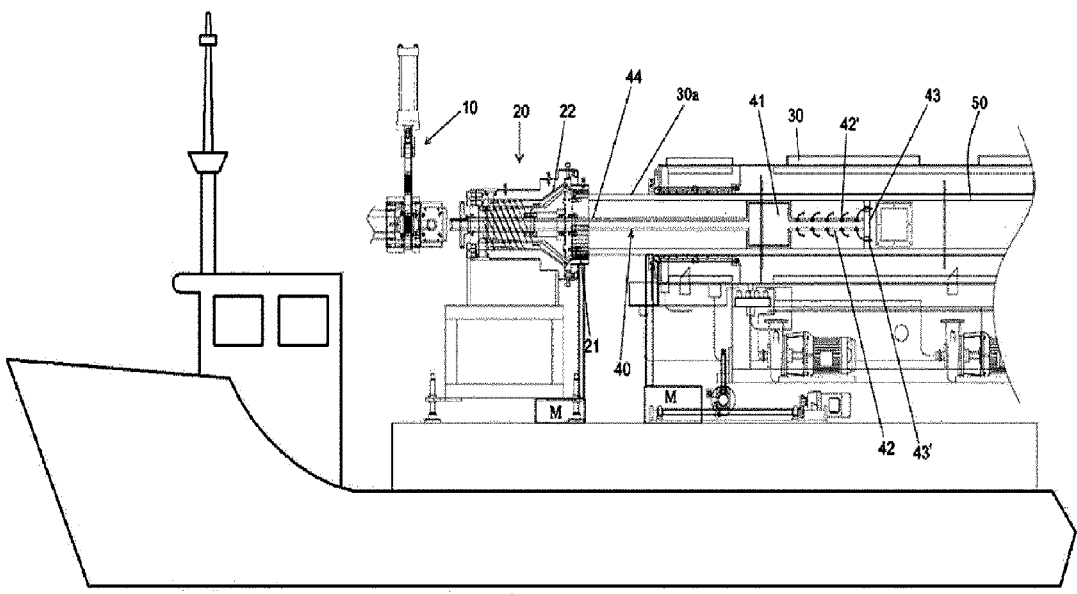
FIG. 4 is a configuration diagram illustrating a state in which the manufacturing apparatus of the present disclosure is mounted on a ship.

Meanwhile, a rail 60 may be installed and the manufacturing apparatus of the present disclosure may be mounted on a transfer device 70 that is moved on the rail 60, or the manufacturing apparatus of the present disclosure may be mounted on a ship (see FIG. 4) or a trailer (see FIG. 3). In this way, the synthetic resin pipe 50 having the hollow portion 51 may be directly molded on a site and installed impromptu on the site.

That is, after the rail 60 is installed beside a site for installing the synthetic resin pipe 50, the synthetic resin pipe 50 having the spiral hollow portion 51 formed in the longitudinal direction as in the above-described embodiment may be molded by the synthetic resin pipe manufacturing apparatus mounted on the transfer device 70 moved on the rail and may be directly buried in a site to enable convenient, faster construction.

Also, the apparatus for molding the synthetic resin pipe 50 having the spiral hollow portion 51 formed in the longitudinal direction that is installed on the trailer may be moved to a site to directly mold the synthetic resin pipe 50 on the site and construct the synthetic resin pipe 50.

Meanwhile, as one feature of the synthetic resin pipe manufacturing apparatus according to the present disclosure, the synthetic resin pipe manufacturing apparatus further includes a rotation driver 90.

As illustrated in FIG. 9, the rotation driver 90 is for transmitting rotation power to the air supply pipe 40 and includes: a driven sprocket 91 coupled to an end of the air supply pipe 40 disposed in the cooler 30a of the dice 30; a rotation driving motor 93 having a shaft to which a driving sprocket 92 is coupled; and a rotary belt 94 configured to connect the driven sprocket 91 and the driving sprocket 92 to each other.

As a result, as the rotary belt 94 rotates due to the rotation driving motor 93, the driven sprocket 91 and the air supply pipe 40 to which the driven sprocket 91 is coupled rotate, and the air fitting 41, the air ejection pipe 42, and the air discharge plate 43 which are integrally formed with the air supply pipe 40 also rotate together.

Accordingly, as the air supply pipe 40, the air fitting 41, the air ejection pipe 42, and the air discharge plate 43 rotate, not only sprayed air can be thoroughly sprayed to the inner surface 52 of the synthetic resin pipe 50, but also streams of sprayed air can be combined into one stream of air and move along the inner surface 52 of the synthetic resin pipe 50, and thus a degradation in quality that may occur due to a temperature difference between the streams of sprayed air can be prevented, and in this way, synthetic resin pipes 50 can be manufactured with uniform quality.

Also, the configuration relating to the rotation driver 90 is only one example, and the configuration may be modified and changed in various ways within the scope that satisfies a condition that the air supply pipe 40 is able to be rotated.

Meanwhile, as another feature of the synthetic resin pipe manufacturing apparatus according to the present disclosure, as illustrated in FIGS. 8 and 9, a plurality of recesses 431 configured to discharge the hot air to the outside together with the air discharge holes 43' are formed to be recessed at equal intervals along a circumference of an outer circumferential surface of the air discharge plate 43.

Here, each of the recesses 431 has a semicircular groove structure and discharges the hot air to the outside together with the air discharge holes 43'. In particular, the hot air may stagnate, without being properly discharged, due to a blocked space between the inner surface 52 of the synthetic resin pipe 50 and the air discharge plate 43, and thus cooling treatment may not be properly performed, and by allowing the hot air to be discharged to the outside through portions between the inner surface 52 of the synthetic resin pipe 50 and each of the recesses 431, each of the recesses 431 help immediate exhaustion of the hot air to the outside.

Meanwhile, as still another feature of the synthetic resin pipe manufacturing apparatus according to the present disclosure, the synthetic resin pipe manufacturing apparatus further includes a coolant circulation unit 100. As illustrated in FIGS. 11 to 13, the coolant circulation unit 100 includes: a first tank 101 which is empty; a second tank 102 accommodating a refrigerant; a coolant storage tank 103 disposed between the first and second tanks 101 and 102; a circulation pipe body 104 for supplying a coolant stored in the storage tank 103 toward the cooler 30a of the dice 30 and then recovering the coolant toward the storage tank 103; a flexible-type first pipe body 105 configured to connect the first tank 101 and the storage tank 103 to each other; a flexible-type second pipe body 106 configured to connect the second tank 102 and the storage tank 103 to each other; a relay pipe body 107 disposed in the storage tank 103 and configured to connect the first and second pipe bodies 105 and 106 to each other; and a tank lifting/lowering device 108 configured to allow the first and second tanks 101 and 102 to be selectively lifted and lowered.

Here, the refrigerant stored in the second tank 102 may be liquid nitrogen but may also be a substance other than liquid nitrogen as long as the substance can cool a coolant to an appropriate temperature through a heat exchange with the coolant.

Also, the first and second pipe bodies 105 and 106 are formed of a flexible pipe body structure that is freely bendable and length extendable.

Also, a plurality of heat dissipation fins 107a are disposed on the relay pipe body 107 in the longitudinal direction thereof, and the heat dissipation fins 107a can increase a contact area with a coolant and thus improve heat exchange efficiency.

Also, the tank lifting/lowering device 108 is formed of a pneumatic cylinder main body that has an end of a piston connected to a lower surface of a tank and the piston embedded therein to vertically move back and forth by selective air supply, and for stable movement when the piston vertically moves back and forth, a column, an auxiliary block, or the like that may guide the movement may be further provided. The tank lifting/lowering device 108 formed in this way is disposed on a lower surface of each of the first and second tanks 101 and 102, and the operation of the tank lifting/lowering device 108 is controlled by a separate controller.

As one example of the operation control, according to external operation or a sensing value detected by a sensor or the like, the controller may cause the tank lifting/lowering device 108 disposed on the lower surface of the second tank 102, among the first and second tanks 101 and 102, to be driven, and accordingly, a refrigerant may flow from the second tank 102, which has moved upward, toward the first tank 101 at the other side, the refrigerant flowing in this way may pass through the relay pipe body 107, and a heat exchange may occur between the refrigerant passing through the relay pipe body 107 and the coolant recovered to the storage tank 103. In this way, the coolant can be cooled to an appropriate temperature.

As another example, as driving of the tank lifting/lowering device 108 is controlled by the controller, the first tank 101 may move upward, and the second tank 102 may move downward and return to its original position, and as a result, the refrigerant may be transferred from the first tank 101, in which the refrigerant is stored after flowing, toward the opposite side, that is, the second tank 102 where the refrigerant was initially stored. The coolant is cooled as such a transfer of the refrigerant is repeated.

Therefore, as the first and second tanks 101 and 102 are selectively lifted and lowered by the tank lifting/lowering device 108, refrigerant movement is possible therebetween, and a heat exchange occurs between the refrigerant passing through the relay pipe body 107 and the coolant recovered to the storage tank 103.

Meanwhile, as yet another feature of the synthetic resin pipe manufacturing apparatus according to the present disclosure, the synthetic resin pipe manufacturing apparatus further includes a coolant temperature control unit 200 and a cooling air supply pipe 300. As illustrated in FIGS. 10 to 12, the coolant temperature control unit 200 includes: a support 201 configured to support an outlet of the circulation pipe body 104 that is disposed inside the storage tank 103; and a support lifting/lowering device 202 configured to cause the support 201 to be lifted and lowered.

Here, the support 201 is formed of a plate-type structure disposed to be spaced apart from an upper side of the storage tank 103 or a bar-type structure that crosses the upper side of the storage tank 103, and the outlet of the circulation pipe body 104 is fixed and coupled to the support 201.

Also, as in FIG. 12, the support lifting/lowering device 202 includes a rack 202*a* mounted on an outer wall of the storage tank 103, a screw 202*b* fastened to an end side of the support 201 past the rack 202*a*, and a screw driver 202*c* configured to provide rotation power to the screw 202*b*.

In particular, the screw driver 202*c* provides rotation power to the screw 202*b* by a pair of gears with intersection axes that are engaged with each other by being coupled to each of a lower end of the screw 202*b* and a shaft of a driving motor.

Further, the support lifting/lowering device 202 may further include a fixed rack 202*d* mounted on the outer wall of the storage tank 103 to allow the support 201 to vertically move back and forth by rotation of the screw 202*b* and a guide column 202*e* inserted into the fixed rack 202*d* to slide and be coupled to an end of the support 201.

Therefore, the vertical position of the support 201 may be controlled by the support lifting/lowering device 202, and by such control, the height of the outlet of the circulation pipe body 104 may be controlled in the storage tank 103. As a result, as a distance between the outlet of the circulation pipe body 104 and the relay pipe body 107 is controlled, the time during which the coolant sprayed through the outlet of the circulation pipe body 104 falls, a distance at which the coolant falls, and a spraying range of the coolant may be changed to control a coolant cooling temperature.

As illustrated in FIGS. 11 to 13, the cooling air supply pipe 300 is formed of a pipe body structure for connecting the storage tank 103 and the air ejection pipe 42 to each other and supplying cooled air from the storage tank 103 toward the air ejection pipe 42.

As a result, without being exhausted to the outside, cold air generated during the heat exchange between the refrigerant and the coolant is supplied toward the air ejection pipe

42 and used for cooling the inner surface 52 of the synthetic resin pipe 50, and in this way, energy consumption can be reduced, and cooling efficiency can be improved.

Meanwhile, as illustrated in FIG. 13, as another example of the synthetic resin pipe manufacturing apparatus according to the present disclosure, the storage tank 103 is provided as two or more storage tanks 103 arranged in a row, the outlet of the circulation pipe body 104 is divided into two or more first circulation branch pipes 104*a*, each of the first circulation branch pipes 104*a* is disposed in one of the two or more storage tanks 103, wherein heights at which the first circulation branch pipes 104*a* are disposed are different from each other, an inlet of the cooling air supply pipe 300 is branched into two or more supply branch pipes 301, each of the supply branch pipes 301 is connected to one of the two or more storage tanks 103, air of one of the supply branch pipes 301 is selected and supplied toward the air ejection pipe 42 by a distribution port 302, an inlet of the circulation pipe body 104 is divided into two or more second circulation branch pipes 104*b*, each of the second circulation branch pipes 104*b* is connected to a bottom side of one of the two or more storage tanks 103, and a coolant of one of the second circulation branch pipes 104*b* is selected and supplied toward the cooler 30*a* of the dice 30 by a circulation distribution port 104*c*.

As a result, the temperature of the coolant heat-exchanged with the refrigerant is different in each of the storage tanks 103, the coolants having temperatures different from each other in this way may be selected for use, the temperature of generated cooling air is also different in each of the storage tanks 103, and the streams of cooling air having temperatures different from each other in this way may be selected for use.

Meanwhile, as illustrated in FIG. 14, the cooler 30*a* may be divided into several vacuum zones. The division may be performed by a diaphragm 30*b* of a valve or the like, a hole that allows the synthetic resin pipe 50 to pass therethrough may be formed at the center of the diaphragm 30*b*, and in particular, as the hole is narrower and comes in close contact with an outer circumferential surface of the synthetic resin pipe 50, a flow of cooling air between the adjacent vacuum zones may be blocked, and each of the streams of cooling air having different temperatures is supplied from each of the supply branch pipes 301 to one of the vacuum zones. By controlling the temperature of cooling air and appropriately supplying each of the streams of cooling air having temperatures different from each other to one of the vacuum zones, a high-quality synthetic resin pipe may be produced.

Meanwhile, the synthetic resin pipe manufacturing apparatus according to the present disclosure may further include:

an ultrasonic inspection unit, and the ultrasonic inspection unit may be mainly classified into an ultrasonic inspection unit of a first implementation example and an ultrasonic inspection unit of a second implementation example. Hereinafter, the ultrasonic inspection unit of the first implementation example will be denoted by the reference numeral "400," and the ultrasonic inspection unit of the second implementation example will be denoted by the reference numeral "400A."

As illustrated in FIG. 15, the ultrasonic inspection unit 400 of the first implementation example is for a surface inspection of the synthetic resin pipe 50 manufactured by passing through the air discharge plate 43 and includes: a cylindrical housing 401 having the synthetic resin pipe 50 positioned therein and disposed to be rotatable about an axis of the synthetic resin pipe 50; an ultrasonic sensor 402 fixed to the housing 401 to rotate together with the housing 401 and disposed to be spaced apart from the synthetic resin pipe 50; a slip ring 404 having a circular shape surrounding a rotation area of the ultrasonic sensor 402 and configured to transmit a signal to the ultrasonic sensor 402 and supply electricity to the ultrasonic sensor 402 through a signal transmission member 403 which is disposed to be fixed to the outside so as not to rotate and is electrically and mechanically connected to the ultrasonic sensor 402 during rotation of the housing 401; a fluid guiding member 405 disposed between the housing 401 and the synthetic resin pipe 50 and configured to guide a flow of fluid supplied from the outside of the housing 401 to the inside thereof; and a housing driver 406 configured to transmit rotation power to the housing 401.

Here, fluid inlets 401a configured to introduce a fluid into the housing 401 are symmetrically disposed at both sides about the ultrasonic sensor 402.

Also, the fluid guiding member 405 is disposed at each of the fluid inlets 401a and is formed of a structure in which a gap between an outer side surface of the fluid guiding member 405 and the housing 401 gradually increases as the fluid introduced from the fluid inlet 401a approaches the ultrasonic sensor 402, and a gap between an inner side surface of the fluid guiding member 405 and the synthetic resin pipe 50 gradually decreases from the ultrasonic sensor 402 side toward a side of a gap where the inner side surface is spaced apart from the synthetic resin pipe 50.

In particular, as in FIG. 16, a plurality of linear outer guides 405a that protrude while radially disposed about the center of the fluid guiding member 405 are formed along an outer circumferential surface of the fluid guiding member 405, and a plurality of linear inner guides 405b that protrude while radially disposed about the center of the fluid guiding member 405 are formed along an inner circumferential surface of the fluid guiding member 405.

Also, as in FIG. 15, the ultrasonic inspection unit 400 further includes a supply pipe body 407 branched from the circulation pipe body 104, which is positioned at an outlet side of the storage tank 103, and configured to supply a coolant to the fluid inlet 401a and a recovery pipe body 408 branched from the circulation pipe body 104, which is positioned at an inlet side of the storage tank 103, and configured to recover the coolant supplied into the housing 401.

The ultrasonic inspection unit 400 is an inspection unit using ultrasonic waves that performs an inspection of a surface of the synthetic resin pipe 50 while rotating around the synthetic resin pipe 50, and a fluid such as water may be used as a contact material between the ultrasonic sensor 402 and the surface of the synthetic resin pipe 50. In the present disclosure, as described above, a coolant recovered after being supplied to the dice 30 is utilized.

Also, the housing driver 406 may include a driving motor 406a, a first sprocket 406b coupled to one side of the housing 401, a second sprocket 406c coupled to a shaft of the driving motor 406a, and a driving belt 406d configured to connect the first and second sprockets 406b and 406c to each other, but this is only an example, and the housing driver 406 may be modified and changed in various ways within the scope that satisfies a condition for rotating the housing 401.

Also, as the ultrasonic sensor 402, an even number of ultrasonic sensors 402 may be disposed to adjust rotation balance by rotation. For example, two ultrasonic sensors 402 may be disposed at a 180° interval, four ultrasonic sensors 402 may be disposed at 90° intervals, or six ultrasonic sensors 402 may be disposed at 60° intervals.

Further, the ultrasonic sensor 402 rotates about an axial direction of the synthetic resin pipe 50 to perform an inspection of an exterior of the synthetic resin pipe 50 that is moving, and accordingly, the ultrasonic sensor 402 performs an inspection of a surface of the synthetic resin pipe 50 in a diagonal direction.

For the ultrasonic sensor 402 to perform an inspection of all surfaces of the synthetic resin pipe 50 without missing any part thereof using the above method, of course, the number of ultrasonic sensors 402 may be increased or a rotational speed of the ultrasonic sensor 402 may be increased.

The housing 401 and a surface of the synthetic resin pipe 50 may be spaced apart from each other, and a portion therebetween may be filled with a fluid. In particular, a portion between the ultrasonic sensor 402 and the surface of the synthetic resin pipe 50 may be filled only with a fluid without interference with another member.

The fluid guiding member 405 serves to guide the fluid introduced from the fluid inlet 401a so that the portion between the ultrasonic sensor 402 and the surface of the synthetic resin pipe 50 may be filled up with the fluid, and simultaneously, serves to guide the fluid to be discharged through a gap between the fluid guiding member 405 and the surface of the synthetic resin pipe 50.

The fluid guiding member 405 rotates together with the housing 401.

Further, the fluid guiding member 405 is for preventing bubble generation due to formation of a vortex or turbulent flow of the fluid between the ultrasonic sensor 402 and the surface of the synthetic resin pipe 50, and in particular, the fluid guiding member 405 can further prevent bubble generation through that above-described outer and inner guides 405a and 405b.

Also, the slip ring 404 is formed in a circular shape using a conductive material such as copper (Cu) and aluminum (Al), and the signal transmission member 403 having predetermined tension is disposed at an outer side of the ultrasonic sensor 402.

The signal transmission member 403 is connected to the ultrasonic sensor 402 to transmit an output signal from the ultrasonic sensor 402, and according to rotation of the ultrasonic sensor 402, the signal transmission member 403 rotates together while maintaining contact with the slip ring 404.

The slip ring 404 is able to transmit a signal because a path along which the signal transmission member 403 moves is made of a conductive material, and the slip ring 404 sends the signal to a control device or a processor. Supply of electricity from the outside to the ultrasonic sensor 402 may also be performed in this way.

Meanwhile, as in FIG. 17, a cooling zone 30c having a larger diameter than the synthetic resin pipe 50 is formed behind the air discharge plate 43 in the cooler 30a of the dice 30. The coolant introduced into the cooler 30a finally cools the synthetic resin pipe 50 while passing through the cooling zone 30c.

As illustrated in FIGS. 17 and 18, the ultrasonic inspection unit 400A of the second implementation example includes: an annular support member 400A1 disposed in the cooling zone 30c in a form surrounding the synthetic resin pipe 50; a plurality of ultrasonic sensor parts 400A2 radially provided on an inner circumferential surface of the support member 400A1; and two or more relay parts 400A3 radially disposed on an outer circumferential surface of the support member 400A1 to connect the support member 400A1 to an inner circumferential surface of the cooling zone 30*c* while the support member 400A1 is spaced apart from the inner circumferential surface.

Here, the ultrasonic sensor parts 400A2 perform an inspection to check whether there is an abnormality such as a crack or damage on an outer wall of the synthetic resin pipe 50 which is a target of the inspection.

Further, ultrasonic sensors forming the ultrasonic sensor parts 400A2 may be radially formed in an axial direction of the support member 400A1, radially formed in a direction perpendicular to the axis of the support member 400A1, or formed with a combination thereof. Since ultrasonic waves radiated from the ultrasonic sensors are radiated within a predetermined angle range even when the ultrasonic sensors are radially formed in the axial direction, the inspection can be performed in all directions.

In the above description of the present disclosure, a "synthetic resin pipe manufacturing apparatus" having a specific shape and structure has been mainly described with reference to the accompanying drawings, but the present disclosure may be modified and changed in various ways by those of ordinary skill in the art, and such modifications and changes should be construed as falling within the protection scope of the present disclosure.

The invention claimed is:

1. A synthetic resin pipe manufacturing apparatus comprising:

an extruder (20) configured to, while slowly rotating a resin supplied from a raw material supply device (10), extrude a synthetic resin pipe (50) through a blow molding portion (21) such that a hollow portion (51) is formed in a spiral shape in a longitudinal direction;

an air supply pipe (40) provided inside the extruder (20);

an air fitting (41) having a cylindrical shape with the same inner diameter as the synthetic resin pipe (50), the air fitting (41) being disposed in front of the air supply pipe (40) to support an inner surface (52) of the synthetic resin pipe (50) as the synthetic resin pipe (50) is extruded from the extruder (20) and introduced into a cooler (30*a*) of a dice (30);

an air ejection pipe (42) disposed in front of the air fitting (41) and having a plurality of air holes (42') formed therein to cool the inner surface of the synthetic resin pipe (50);

an air discharge plate (43) disposed in front of the air ejection pipe (42) and having a plurality of air discharge holes (43') perforated through the air discharge plate (43) to discharge to the outside hot air generated by cooling the inner surface of the synthetic resin pipe (50) with air ejected through the air holes (42'), wherein the air supply pipe (40) is disposed behind the air fitting (41) and has a plurality of air holes (44) formed therein to discharge air and cool the hollow portion (51) of the synthetic resin pipe (50) while the synthetic resin pipe (50) is being extruded from the extruder (20); and a rotation driver (90) configured to transmit rotation power to the air supply pipe (40), wherein the rotation driver (90) rotates the air supply pipe (40) and thereby rotates the air fitting (41), the air ejection pipe (42), and the air discharge plate (43) that are integrally formed with the air supply pipe (40), wherein a plurality of recesses (431) recessed at equal intervals along a circumference of an outer circumferential surface of the air discharge plate (43), each recess (431) having a semicircular groove structure and allowing hot air to pass between the recess (431) and the inner surface 52) of the synthetic resin pipe (50) so that the hot air is discharged to the outside in conjunction with the air discharge holes (43'), wherein the synthetic resin pipe manufacturing apparatus further comprises an ultrasonic inspection unit (400A) and a cooling zone (30*c*), the ultrasonic inspection unit (400A) being configured to perform a surface inspection of the synthetic resin pipe (50) as the synthetic resin pipe (50) passes through the air discharge plate (43), and the cooling zone (30*c*) having a larger diameter than the synthetic resin pipe (50) and being formed behind the air discharge plate (43) in the cooler (30*a*) of the dice (30).

2. The synthetic resin pipe manufacturing apparatus of claim 1, wherein the ultrasonic inspection unit (400A) includes:

an annular support member (400A1) disposed in the cooling zone (30*c*) in a configuration surrounding the synthetic resin pipe (50);

a plurality of ultrasonic sensor parts (400A2) radially provided on an inner circumferential surface of the support member (400A1); and two or more relay parts (400A3) radially disposed on an outer circumferential surface of the support member (400A1) to connect the support member (400A1) to an inner circumferential surface of the cooling zone (30*c*) such that the support member (400A1) is spaced apart from the inner circumferential surface.

3. The synthetic resin pipe manufacturing apparatus of claim 2, further comprising a coolant circulation unit (100) that includes a first tank (101) which is empty, a second tank (102) accommodating a refrigerant, a coolant storage tank (103) disposed between the first tank (101) and the second tank (102), a circulation pipe body (104) configured to supply a coolant stored in the coolant storage tank (103) to the cooler (30*a*) of the dice (30) and then recover the coolant to the coolant storage tank (103), a flexible first pipe body (105) connecting the first tank (101) and the coolant storage tank (103) to each other, a flexible second pipe body (106) connecting the second tank (102) and the coolant storage tank (103) to each other, a relay pipe body (107) disposed inside the coolant storage tank (103) and connecting the first pipe body (105) and the second pipe body (106) to each other, and a tank lifting/lowering device (108) configured to selectively lift or lower the first tank (101) and the second tank (102), wherein, when the first tank (101) and the second tank (102) are selectively lifted or lowered by the tank lifting/lowering device (108), refrigerant moves between the first tank (101) and the second tank (102), and a heat exchange occurs between the refrigerant passing through the relay pipe body (107) and the coolant recovered to the coolant storage tank (103).

\* \* \* \* \*